United States Patent [19]

Conyers et al.

[11] Patent Number: 5,379,197
[45] Date of Patent: Jan. 3, 1995

[54] LIGHTED BICYCLE SAFETY DEVICE

[75] Inventors: Philip C. Conyers; Maxine E. Conyers, both of Connersville, Ind.

[73] Assignee: Conyers (Gpmrr) Enterprises, Inc., Connersville, Ind.

[21] Appl. No.: 20,673

[22] Filed: Feb. 22, 1993

[51] Int. Cl.[6] ............................................. B62J 6/00
[52] U.S. Cl. ...................... 362/72; 362/186; 362/191; 362/198; 362/199; 362/203; 362/269; 362/287; 362/288; 362/390; 362/427; 340/432
[58] Field of Search ............. 362/72, 186, 190, 191, 362/197, 198, 199, 203, 205, 220, 223, 225, 269, 274, 275, 287, 288, 419, 427, 390; 340/432, 983

[56] References Cited

U.S. PATENT DOCUMENTS

| | | | |
|---|---|---|---|
| 1,847,115 | 3/1932 | Kummerle et al. | 340/432 |
| 4,027,150 | 5/1977 | Dean | 340/432 |

FOREIGN PATENT DOCUMENTS

| | | | |
|---|---|---|---|
| 661365 | 5/1938 | Germany | 340/432 |
| 892121 | 8/1953 | Germany | 340/432 |
| 357923 | 10/1931 | United Kingdom | 340/432 |
| 489840 | 8/1938 | United Kingdom | 340/432 |
| 645049 | 10/1950 | United Kingdom | 362/203 |

*Primary Examiner*—Ira S. Lazarus
*Assistant Examiner*—Alan B. Cariaso
*Attorney, Agent, or Firm*—Ice Miller Donadio & Ryan

[57] ABSTRACT

A lighted bicycle safety device with an actuatable safety light contained within a lighting apparatus. A light, power sours, and light switch are all compactly contained within the apparatus, which is pivotally connected to a bicycle to move between an operational orientation where the lighting apparatus is oriented substantially horizontally and laterally and the illuminating lens extends beyond the outermost side of the bicycle, and a storage orientation where the lighting apparatus is oriented flush with the plane of the bicycle frame. A straightening spring absorbs impacts of passing motor vehicles. An on-off switch projects from and slides along a channel formed in the apparatus. The switch moves a sleeve and a light bulb retainer to shift the light bulb between on and off positions.

5 Claims, 9 Drawing Sheets

LIGHTED BICYCLE SAFETY DEVICE

FIELD OF THE INVENTION

This invention relates to lighted bicycle safety devices, and, in particular, to a lighted bicycle safety device which pivots between an operational horizontal orientation and a storage orientation, and which provides an improved light switch means.

BACKGROUND OF THE INVENTION

Bicycling, in addition to providing an alternate form of transportation for many, continues to be a popular recreational and sporting activity. Weather permitting, bicyclists can often be seen riding about at almost any time of day and at all times of year. As bikepaths are not always provided, bicyclists often resort to traveling along roads and public highways also utilized by motor vehicles. Unfortunately, even absent reckless behavior by any party, the crowding of motor vehicles and bicycles on the same roads occasionally spawns collisions between the two, with injuries or fatalities resulting. Typically, collisions result because the motorist did not observe the bicyclist until too late to avoid a collision. Or, when passing a bicyclist, a motorist simply misjudged the clearance between the bicycle and the vehicle and sideswiped the bicycle.

In order to decrease the probability of collisions between bicycles and motor vehicles, bicyclists utilize a number of safety devices to make their presence more visible to motorists. For instance, during daytime operations, an assortment of different safety devices which display flags can be mounted on bicycles. Representative devices employ brightly colored flags disposed on either upright support rods or horizontally extending support rods. While effective during the day, these types of safety devices offer minimal or no increased bicyclist visibility during nighttime bicycling.

Other bicycle safety devices provide features intended to increase visibility of bicyclists during nighttime, or more likely dawn or dusk, operation. U.S. Pat. Nos. 3,972,302, 3,982,771, 4,321,883, 4,483,586, 4,575,189, and 4,586,454 all disclose bicycle safety devices wherein reflectors are mounted on horizontally extending members. These devices are designed to ideally serve two functions. The horizontal extension attempts to persuade motorists to allow sufficient clearance between the bicycle and vehicle when passing so as to not sideswipe and topple the bicyclist, and the reflector is an attempt to provide increased visibility. However, the shortcoming of these devices results from the very nature of reflectors. Without incident light, reflectors supply no visibility advantages to the bicyclist. Therefore, on dark nights in areas without house or street lights, motorists only become aware of the presence of a bicyclist when their vehicle headlight beams are first incident upon the bicycle and the safety device reflector. As a result, especially when a vehicle is turning or is traveling along a curved section of road, the headlight beams may not strike the reflector until the motor vehicle has nearly overtaken the bicyclist. On such occasions, the horizontal extension is of slight value; the motorist has little time to appreciate the significance of the extension as she is already taking swift and necessary measures to simply avoid a direct impact with the bicycle. Of course, the unexpected appearance of a bicyclist in the path of a vehicle does not always result in a disastrous collision. Evasive maneuvers taken by a motorist usually avert such an impact. However, these nerve-wracking maneuvers are unsettling and potentially dangerous to all involved as well as innocent bystanders and other vehicles. Because reflectors have visibility shortcomings which do not eliminate the need to conduct such maneuvers, reflector type safety devices are inadequate.

In alternate attempts to address bicycle visibility problems during nighttime operation, lighted safety devices have been mounted to bicycles. These lights are extremely desirable as they are almost always visible to motorists at greater distances than reflectors. U.S. Pat. Nos. 4,274,127, 4,309,741 and 4,598,339 all disclose bicycle safety devices with vertically disposed lights, mounted to upright poles, which extend above the head of a bicyclist. While these safety devices make the actual presence of a bicyclist more noticeable to motorists, they are all deficient in their failure to provide means to dissuade a motorist from passing too close. At night, a motorist closing on a bicyclist will likely first recognize that bicyclist at a later point than if it were daylight. Therefore, a safety device having means for a motorist driving at night to quickly and better gauge how much to veer to avoid sideswiping the bicyclist is all the more important.

Another shortcoming of existing lighted bicycle safety devices is their complex light switch designs which command increased engineering and manufacturing costs. For instance, many lighted safety devices use light switches which require exactly positioned metal contact points, thereby necessitating precise assembly and expensive fabrication. Other designs, due to the spatial relationship between the light switch and the power source or light bulb, require large quantities of wiring and soldering. The need to pass on to the consumer the increased costs of manufacture results in fewer sales. In addition to reducing profits, fewer sales translates to fewer bicycles outfitted with the safety device. Consequently, some collisions which could have been averted if the safety device were implemented nonetheless occur, resulting in avoidable injury.

Furthermore, some safety device light switches currently existing in the prior art, due to their ease of activation which is part results from their high manufacturing costs, are subject to being accidentally turned on by casual contact. As accidental light activation drains valuable battery-power, it is highly undesirable. Moreover, if at dusk and when away from home a bicyclist first discovers the light was accidentally turned on during the day and has exhausted the electrical power source, the bicyclist must continue without the protection afforded by a lighted bicycle safety device and risk injury.

Still another shortcoming of some existing lighted bicycle safety devices pertains to the location of the power source relative to the light. Because the extending poles do not hold the power source, the power source is located distant from the light, and occasionally independently mounted on the bicycle. As a result, besides requiring extra costly wiring as well as increasing the difficulty of installing the device on a bicycle, the device must be wired to the bicycle itself which is undesirable.

OBJECTS OF THE INVENTION

Accordingly, one object of the invention is to provide a lighted bicycle safety device which horizontally and laterally extends to encourage passing motorists to give a bicycle a wider clearance, thereby decreasing the likelihood of a collision.

Another object of the present invention is to provide a horizontally extending lighted bicycle safety device which includes a spring in the horizontal extension to absorb impacts on the device, thereby decreasing the likelihood of an impact on the bicycle safety device toppling the bicyclist.

Another object of the present invention is to provide a horizontally extending lighted bicycle safety device which pivots to a storage orientation when not in operation, thereby conserving valuable storage space.

A still further object of the present invention is to provide a lighted bicycle safety device with switch means designed to decrease the likelihood of casual contact against the switch means accidentally turning on the light, and which is readily actuatable by a bicyclist.

A still further object of the present invention is to provide a lighted bicycle safety device with switch means constructed from inexpensive molded plastic parts to reduce the cost of manufacture and the cost to consumers, thereby providing greater accessibility to the invention by the public.

A final object of the present invention is to provide a lighted bicycle safety device with a compact design wherein the power source, light switch, and light bulb are all proximately positioned within the device to reduce wiring costs and increase the convenience of installation on a bicycle.

SUMMARY OF THE INVENTION

The bicycle safety device of the present invention, in one form thereof, comprises a lighting apparatus, means for securing or installing the lighting apparatus to the frame of a bicycle, and means for pivoting the lighting apparatus with respect to the securing means to orientations between and including an operational orientation, wherein the lighting apparatus is oriented substantially horizontally and laterally, and a storage orientation. The lighting apparatus includes an elongated illuminating lens connected to a power source housing, a light bulb, a light bulb retaining member, a power source, and a light switch means for shifting the light bulb between an outward off-position, where the light bulb is not connected to the power source, and an inward on-position, where the light bulb is in electrical communication with the power source. When horizontally oriented, the illuminating lens of the lighting apparatus can extend beyond the outermost side of the bicycle. The device can further include a straightening spring coupling the lighting apparatus to the pivot means.

In another form of the present invention, the lighted bicycle safety device comprises a lighting apparatus, means for securing the lighting apparatus to the frame of a bicycle, means for pivoting the lighting apparatus with respect to the securing means, and a straightening spring coupling the lighting apparatus to the pivot means. The lighting apparatus includes an elongated illuminating lens connected to a power source housing, a light bulb and a power source. The lighting apparatus can be pivoted to orientations between and including a first orientation, wherein the lighting apparatus is oriented substantially horizontally and substantially laterally and the illuminating lens extends beyond the outermost bicycle side, and a second orientation, wherein the lighting apparatus is substantially flush with the plane of the bicycle frame.

DETAILED DESCRIPTION

Figure 1:
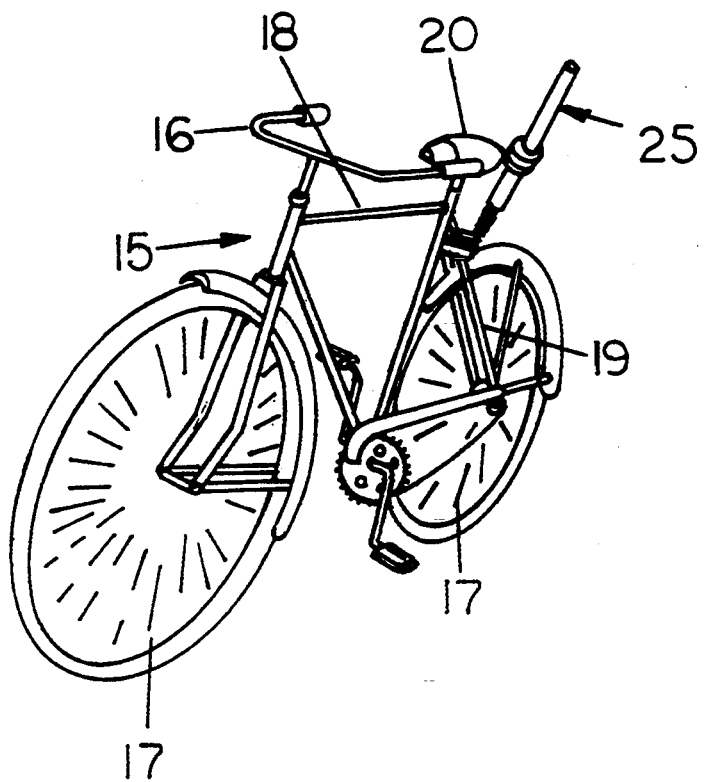
FIG. 1 shows a perspective view of one embodiment of the lighted bicycle safety device of the present invention, installed on a bicycle, aligned in a storage s orientation.
Figure 10:
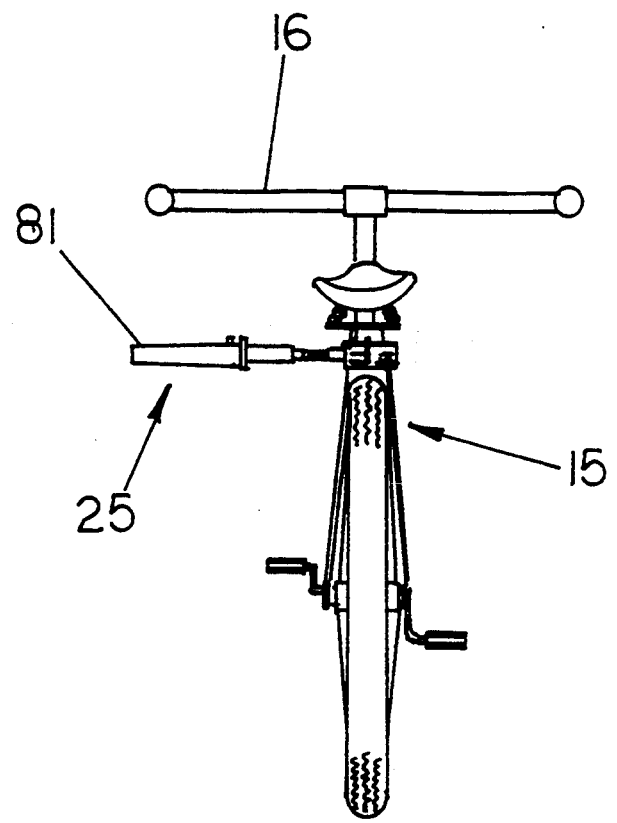
FIG. 10 shows a rear view of the lighted bicycle safety device of the present invention, installed on a bicycle, where the device extends beyond the bicycle handlebars.

Referring now to FIG. 1 and FIG. 10, there is shown one embodiment of the lighted bicycle safety device of the present invention secured or installed on bicycle 15. The device, generally designated 25, is shown in FIG. 10 in a preferred operational orientation wherein it extends substantially horizontally and laterally from bicycle 15. A storage orientation, wherein device 25 maintains a substantially vertical orientation after being pivoted upward from the operational orientation, is shown in FIG. 1. Bicycle 15 comprises wheels 17, frame 18, seat 20, and handlebars 16. The outer limits of handlebars 16 define the outermost sides of bicycle 15. As is well known in the art, bicycle frame 18 is constructed from tubular metal members, and specifically includes frame members 19 which connect the portion of bicycle frame 18 below seat 20 with rear wheel 17.

Figure 2:
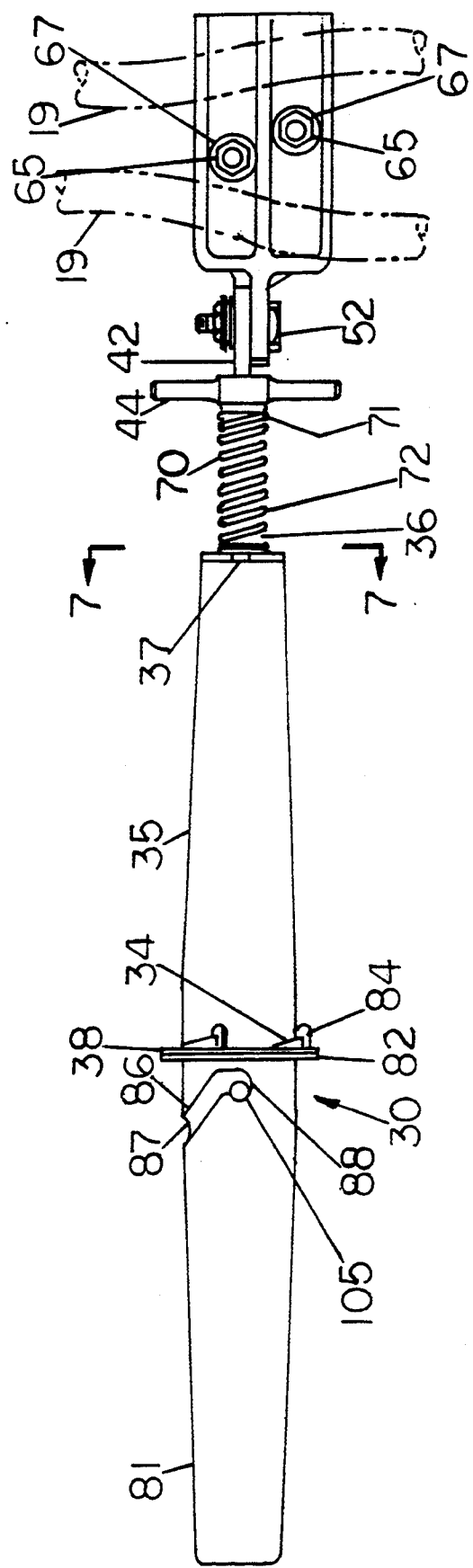
FIG. 2 shows a top view of the lighted bicycle safety device of FIG. 1 when the device is in the operational horizontal orientation.
Figure 3:
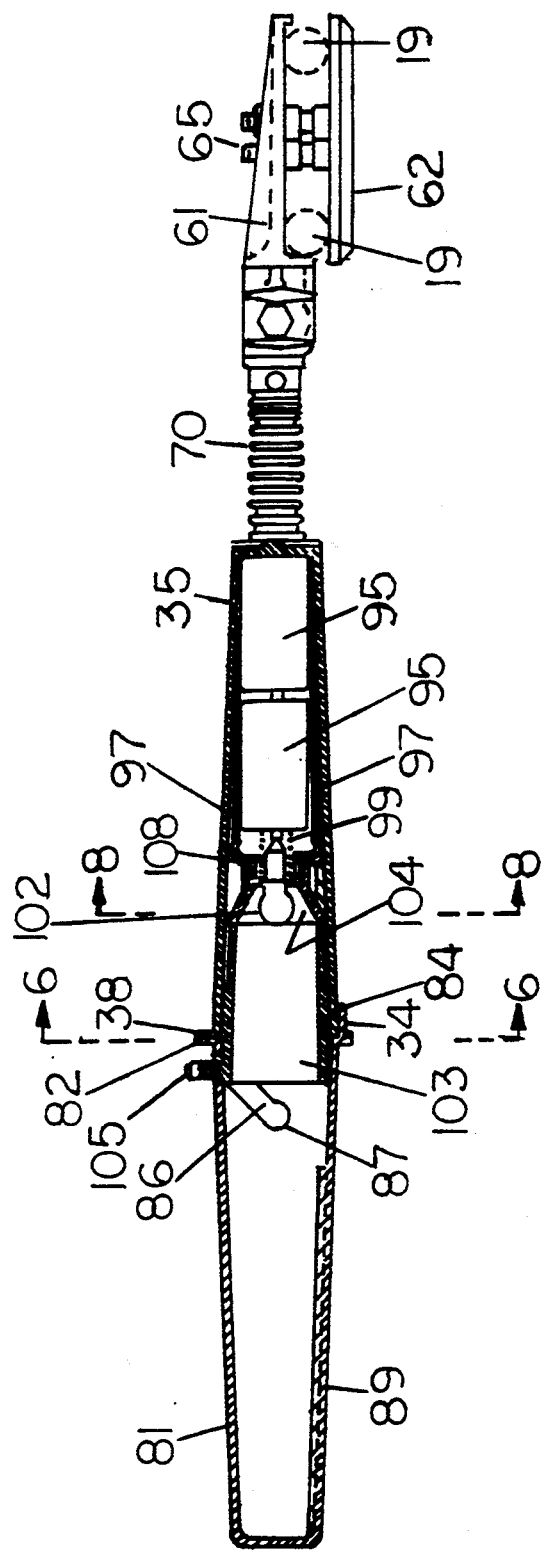
FIG. 3 shows a rear side view of the lighted bicycle safety device of FIG. 1, partially in section, when the light is in the on-position.
Figure 4:
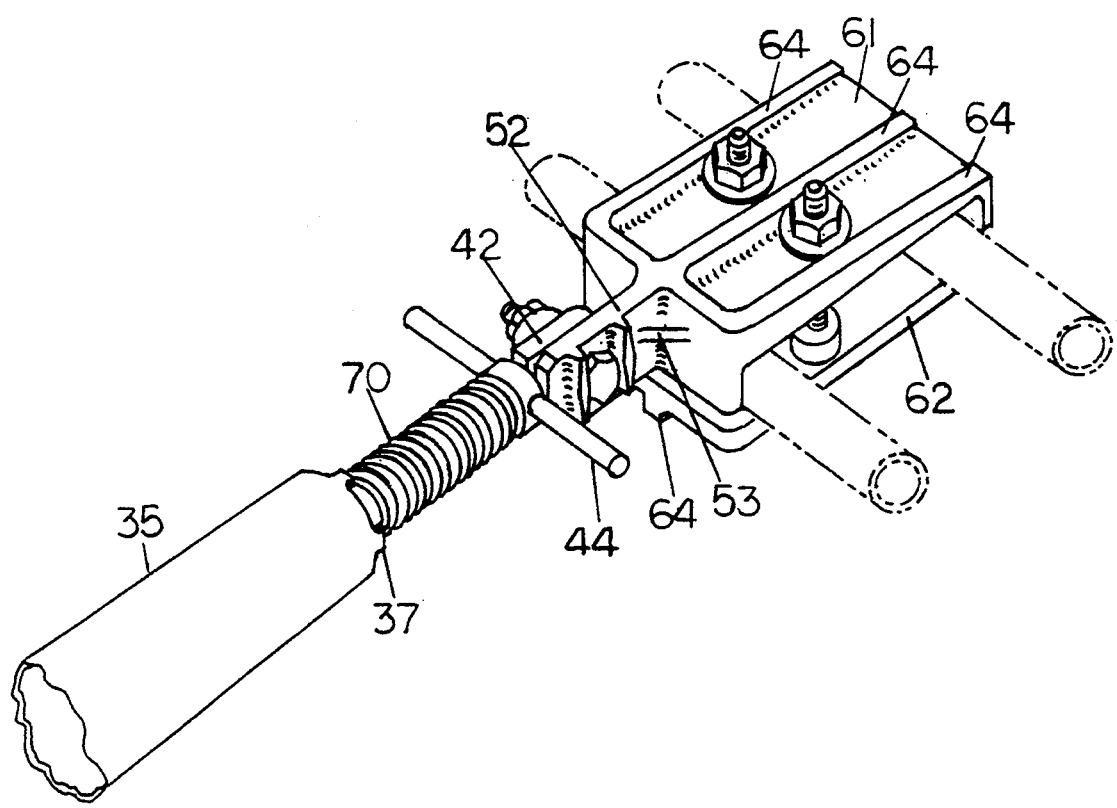
FIG. 4 shows a perspective view of the securing means and pivot means of the lighted bicycle safety device of FIG. 1.

Referring now to FIGS. 2, 3, and 4, the means to secure device 25 to bicycle 15 in this embodiment includes opposing top and bottom clamp members 61, 62. A pair of bolts 65 cooperate with washers 67 and locking nuts 66 to tighten clamp members 61, 62 against frame members 19. Ridges 64 are molded integral with plastic clamp members 61, 62 to provide increased thickness and increased rigidity. The use of ridges 64 dispenses with the need to increase rigidity by making clamp members 61, 62 uniformly thicker, and thereby decreases the materials cost of manufacture.

Figure 5:
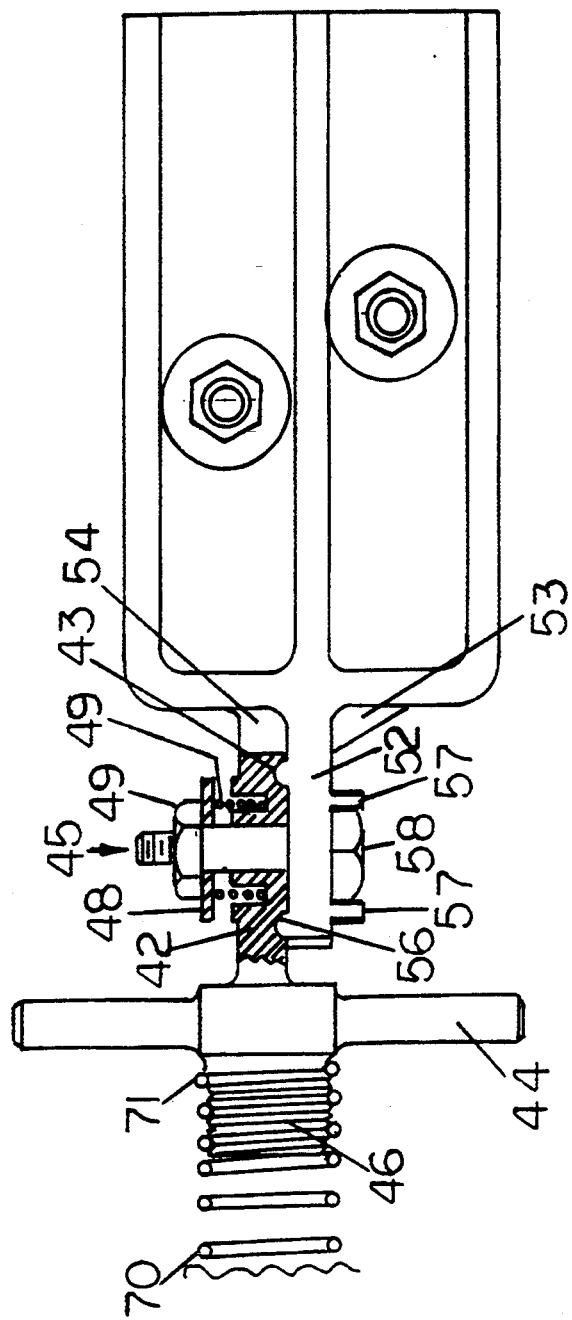
FIG. 5 shows a top view of the pivot means wherein the compression spring assembly is shown in section.

The components of device 25 which effect the pivoting aspect of the present invention are clearly shown in FIG. 4 and FIG. 5. Top clamp member 61 is molded with a lateral extension, generally L-shaped in vertical cross-section, which comprises clamp or first pivot member 52 and stop member 54. Pivot member 52, oriented substantially vertically, and stop member 54, substantially perpendicular to pivot member 52, extend laterally or outward an equal distance. Support rib 53, best shown in FIG. 4, improves the rigidity of first pivot member 52. A number of detents 56 are formed on the forward surface of pivot member 52, and two projections 57, which combine to prevent bolt 58 from rotating, are formed on the rearward surface of pivot member 52. A second pivot member 42, constructed with indents 43 which mate with detents 56 on clamp pivot member 52, frictionally engages pivot member 52 to allow pivoting of device 25. During pivoting, stop member 54 acts against second pivot member 42 to prevent lighting apparatus 30 from pivoting downward beyond a horizontal orientation. A compression spring assembly 45 biases second pivot member 42 against clamp pivot member 52 to ensure a suitable frictional connection therebetween. Spring assembly 45 utilizes compression spring 47, which is received within an annular recess formed in second pivot member 42, and bolt 58, which passes through spring 47 as well as through apertures provided in both pivot members 52, 42. Assembly washer 48 and locking nut 49 are inserted on bolt 58 and combine to compress and pre-load spring 47 such that it constantly provides biasing force to keep pivot members 52, 42 together. This compression spring assembly biasing force, coupled with the mating relationship between detents 56 and indents 43, yields a pivot connection capable of maintaining device 25 in a variety of angled orientations to which it can be pivoted.

Second pivot member 42, which is molded from plastic, is formed integral with pivot handle 44. Handle 44 is utilized to facilitate pivoting device 25 by providing a hand grip through which pivoting forces can be applied. Laterally or outwardly extending cylinder 46, which is externally threaded to receive the inward end 71 of straightening spring 70, is also formed integral with pivot member 42.

Figure 6A:
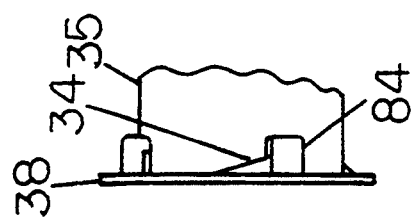
FIG. 6A shows a side view of FIG. 6.
Figure 6:
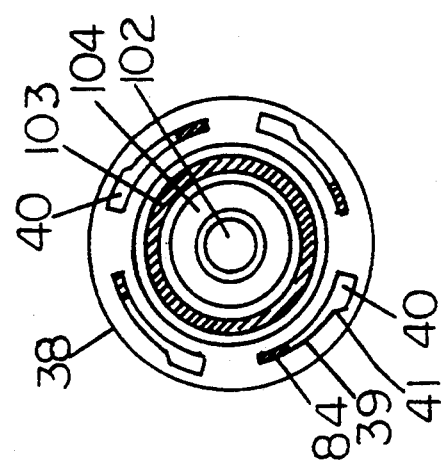
FIG. 6 shows a cross-sectional view of the power source housing taken along line 6—6 of FIG. 3.
Figure 7:
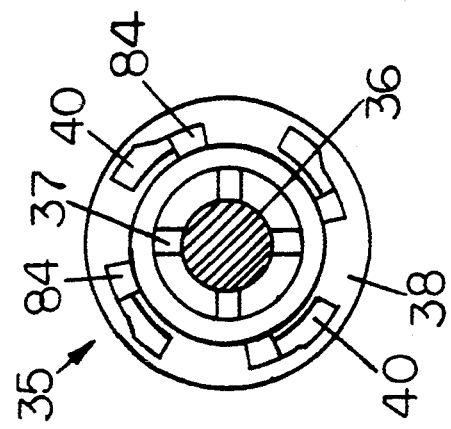
FIG. 7 shows a cross-sectional view of the power source housing taken along line 7—7 in FIG. 2.

Lighting apparatus 30, which holds the light switch, light, and power source of the present invention in a compact design configuration, constitutes a substantial portion, and in this embodiment a majority portion, of the horizontally extending length of device 25. Referring to FIG. 2 and FIG. 3, the exterior of lighting apparatus 30 is constructed from two generally hollow complementary parts, namely power source housing 35 and elongated illuminating lens 81. Power source housing 35 is fabricated from an opaque plastic material, and elongated illuminating lens 81 is fabricated from a translucent plastic through which light can readily be seen. The exterior inner end of power source housing 35 comprises externally threaded cylinder 36 which engages outer end 72 of straightening spring 70. Through this interconnection, lighting apparatus 30 is coupled with the pivot means and the securing means. Radial ribs 37, best shown in FIG. 7, provide increased stiffness to inwardly extending cylinder 36. Power source housing 35 terminates at the opposite or outer end with ring element 38. As shown in FIG. 6, four insertion openings 40, employed in the coupling of power source housing 35 and lens 81, are formed in ring element 38. Each insertion opening 40 includes a stepped taper 41 that ends at arcuate slot 39. As shown in FIG. 6A, formed on power source housing 35 at a location adjacent each arcuate slot 39 of ring element 38 is ramped connection member 34.

Referring to FIG. 3, elongated illuminating lens 81 is substantially cylindrical and terminates at its inner end with mating ring element 82 formed with four inwardly extending connection hooks 84. The separate elongated illuminating lens 81 and power source housing 35 are securely coupled by first aligning and then inserting connection hooks 84 through insertion openings 40 until mating ring element 82 contacts ring element 38. After insertion, elongated illuminating lens 81 is then rotated in a clockwise direction from the perspective of one positioned at the outer end of the bicycle secured device 25 and looking toward bicycle 15. During this rotation, stepped taper 41 forces each connection hook 84 into arcuate slot 39 wherein connection hook 84 engages ramped connection member 34 of power source housing 35. When lens 81 is completely rotated until connection hook 84 reaches the end of arcuate slot 39, the hook portion of connection hook 84 frictionally engages the flat end portion of ramped connection member 34, thereby releaseably locking lens 81 and power source housing 35 together. In a preferred embodiment as shown in FIG. 10, illuminating lens 81 horizontally extends beyond the outermost side of bicycle 15 as defined by handlebars 16. If during operation lens 81 is struck be a vehicle and broken, or if lenses of different lengths and colors are desired to provide either a greater horizontal extension or a different appearance, lens 81 can easily be replaced. And, because of its novel construction, illuminating lens 81 can be replaced without replacing any of the other components of device 25. Even the light switch of the invention can be reused with a replacement lens. For instance, sleeve 103 with projecting on-off switch 105 is designed to be extracted from the original lens by first being tilted upward and pulled from lens 81. Then, simply by reversing the order and direction of these operations, sleeve 103 can be inserted into the replacement lens.

Figure 8:
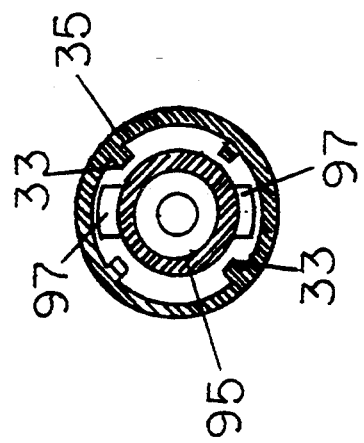
FIG. 8 shows a cross-sectional view of the power source housing and not showing the light bulb mounting portion, taken along line 8—8 of FIG. 3.

In order to increase the stiffness of lighting apparatus 30, axial ribs 89 and 33 are provided in illuminating lens 81 and power source housing 35 respectively. As shown in FIG. 8, ribs 33 formed in power source housing 35 serve the additional function of reducing the amount of play of power source 95 within housing 35.

Figure 9:
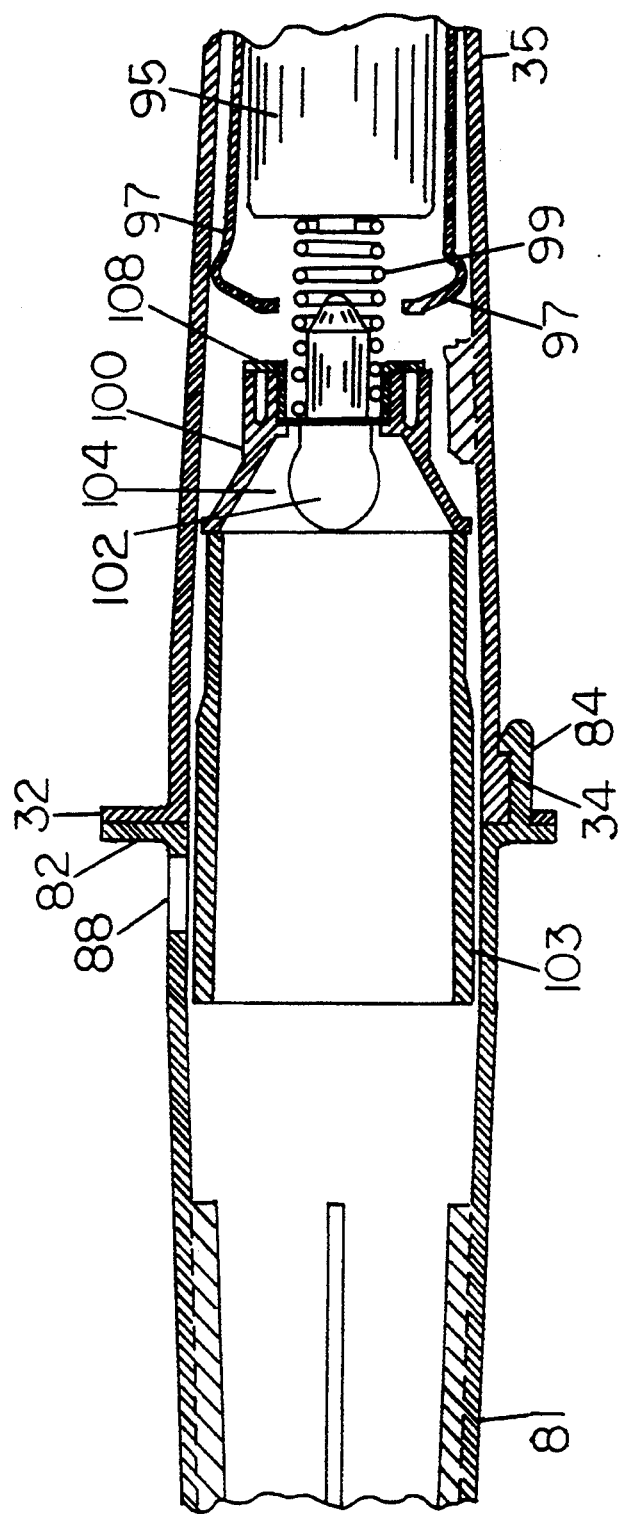
FIG. 9 shows a partial view of the lighting apparatus, shown in section when the light is in the off-position.

The mechanical and electrical workings of the light and light switch means of the shown embodiment of the present invention are readily apparent from the teachings of FIG. 3 and FIG. 9. Referring to FIG. 3, lighting apparatus 30 includes power source 95, or more specifically two dry cell batteries, located within housing 35. A pair of copper battery contacts 97 extend from the negative battery terminal proximate the interior inner end of power source housing 35 to a location outward of power source 95. A copper coated steel spring 99 abuts battery 95 and biases outward light bulb retaining member 100 and light bulb 102. Light bulb retaining member 100 comprises reflector 104 on its outer side and copper contact member 108 on its inner side. Light bulb 102 moves axially within lighting apparatus 30 under the influence of the light switch of the present invention. Projecting on-off switch 105, formed integral with cylindrical sleeve 103, extends through illuminating lens 81 along a helical channel 86 formed therein. Notches 87, 88 disposed at the outer and inner ends of channel 86 respectively form the light off-position and light on-position locations of switch 105. On-position notch 88 is located on the top of lighting apparatus 30 such that switch 105, which is sufficiently large and projecting to be readily controlled, is easily accessible and actuatable by a bicyclist. Sleeve 103, which both rotates and translates within lighting apparatus 30 when switch 105 is slid along channel 86, cooperates with retaining member 100 to effectively shift light bulb 102 between on and off positions.

With reference to FIG. 9, when device 25 is not lighted switch 105 resides at the off-position notch 87 (not shown). As a result, due to the biasing force of spring 99 acting against light bulb 102 and retaining member 100, light bulb 102 is not connected to power source 95. To activate the light in device 25, light bulb 102 must be manually shifted from a location where it is spaced from battery 95 to a location where it contacts battery 95. Specifically, sliding switch 105 along helical channel 86 causes sleeve 103 to rotate and translate and thereby drive retaining member 100 and light bulb 102 inward against the force of spring 99. When switch 105 has been moved to on-position notch 88 as illustrated in FIG. 3, light bulb 102 is brought into contact with power source 95. Light bulb 102 is then in electrical communication with power source 95 and is illuminated. More particularly, light bulb 102 completes the circuit between the positive battery terminal and spring 99, which contacts copper contact member 108, which contacts battery contacts 97, which contacts the negative terminal of battery 95.

As will be appreciated by those of skill in the art in view of the foregoing disclosure, lighted bicycle safety device 25 provides the following beneficial features. When employed, device 25 is operationally oriented to extend substantially horizontally and laterally from bicycle 15 to reduce the risk of collision with motor vehicles by encouraging passing motorists to give bicyclists wider clearance. After use, or when lighted bicycle safety device 25 is not needed, it can be pivoted to a storage orientation, thereby conserving storage space. Pivot handle 44 can be grasped to facilitate pivoting lighting apparatus 30 90° from the operational orientation to a substantially vertical orientation. A vertical storage orientation is not necessary to the invention, but rather results from the relationship between device 25 and bicycle frame 18. As will be appreciated by those of skill in the art, any storage orientation, including the vertical orientation, wherein lighting apparatus 30 has been pivoted approximately 90° from the operational orientation to be substantially flush with the plane of bicycle frame 18 is acceptable. It will also be appreciated by those of skill in the art that straightening spring 70 serves to protect a bicyclist from injury when a glancing blow is struck to the end of illuminating lens 81. As illuminating lens 81 extends beyond the outermost side of bicycle 15, passing motorists who are not discouraged by device 25 and who accidentally strike the safety device 25 can do so without necessarily striking handlebars 16. And, because spring 70 absorbs the majority of the force, the bicyclist is not toppled upon impact. To activate the light, projecting on-off switch 105 must be manual shifted from off-position notch 87 to on-position notch 88. As spring 99 opposes the shifting of light switch 105 to the on-position and because switch 105 operates over a helical path, a non-negligible amount of force purposely directed to moving switch 105 is required. Without making it overly difficult to turn on the safety light when desired, the novel switch means of the present invention practically eliminates the possibility of incidental contact accidentally turning on the light. Furthermore, because of the novel way switch 105 shifts light bulb 102, the contacts of the electrical circuit need not be precisely positioned and manufacturing costs are reduced. And, as device 25 is designed to compactly hold power source 95, light bulb 102 and the switch means in close proximity all within lighting apparatus 30, a number of advantages result. Specifically, electrical wiring between these components is eliminated and installation is easier as the power source 95 need not be independently mounted on bicycle 15.

What is claimed is:

1. A bicycle safety device for use with a bicycle comprising handlebars, which define the outermost sides of the bicycle, and a frame, the device comprising:
    a lighting apparatus comprising
        an elongated lens connected to a power source housing,
        a light bulb,
        a light bulb retaining member,
        a power source, and
        a light switch means for shifting the light bulb between an off-position, where the light bulb is not connected to the power source, and an on-position where the light bulb is in electrical communication with the power source, the light switch means comprising a sleeve rotatable with the apparatus which cooperates with the light bulb retaining member to shift the light bulb between on and off positions, and a projecting on-off switch that is slidably disposed within a channel formed in the apparatus between one and off position notches formed in the apparatus, the projecting on-off switch operatively connected to the rotatable sleeve;
    means for securing the light apparatus to the bicycle frame;
    means, located intermediate the lighting apparatus and the securing means, for pivoting the lighting apparatus with respect to the securing means to orientations between and including an operational orientation, wherein the lighting apparatus is oriented substantially horizontally and laterally such that the illuminating lens extends laterally from the bicycle beyond the outermost bicycle side and is visible from behind the bicycle, and a storage orientation wherein the lighting apparatus is oriented approximately 90° from the operational orientation, the pivot means comprising first and second frictionally engaging pivoting members and a compression spring assembly biasing the pivot members together; and
    a straightening spring coupling the lighting apparatus to the pivot means.

2. The bicycle safety device of claim 1 wherein the pivot means further comprises mating detents and indents, said detents formed in said first pivoting member and said indents formed in said second pivoting member.

3. The bicycle safety device of claim 2 wherein the pivot means further comprises a pivot handle.

4. The bicycle safety device of claim 3 wherein the illuminating lens is interchangeable with lenses of different lengths and colors.

5. A bicycle safety device, for use with a bicycle comprising handlebars, which define the outermost sides of the bicycle and a frame, the device comprising:
    a lighting apparatus comprising:
        an elongated illuminating line connected to a battery housing,
        a light bulb, a battery, and a light switch means for shifting the light bulb between an off-position, wherein the light bulb is spaced from the battery, and an on-position, wherein the light bulb contacts the battery, the light switch means comprising a sleeve rotatable within the apparatus which cooperates with a light bulb retaining member to shift the light bulb between on and off positions, and a projecting on-off switch that is slidably disposed within a channel formed in the apparatus between on and off position notches formed in the apparatus, the projecting on-off switch operatively connected to the rotatable sleeve;

means for securing the lighting apparatus to the bicycle frame, the securing means comprising a clamp;

means for pivoting the light apparatus with respect to the securing means, the pivot means comprising a stop member preventing the lighting apparatus from pivoting downward beyond a horizontal orientation, the stop member comprising a portion of the clamp of the securing means; and a straightening spring coupling the lighting apparatus to the pivot means, such that the light apparatus can be pivoted to orientations between and including a first orientation, wherein the light apparatus is oriented substantially horizontally and substantially laterally and the illuminating lens extending beyond the outermost bicycle side, and a second orientation, wherein the lighting apparatus is substantially flush with the plane of the bicycle frame.

* * * * *